United States Patent [19]

Feit et al.

[11] 3,896,165
[45] July 22, 1975

[54] BENZOIC ACID DERIVATIVES

[75] Inventors: Peter Werner Feit, Gentofte; Ole Bent Tvaermose Nielsen, Vanlose, both of Denmark

[73] Assignee: Lovens Kemiske Fabrick Produktionsaktieselskab, Ballerup, Denmark

[22] Filed: Oct. 25, 1973

[21] Appl. No.: 409,394

Related U.S. Application Data

[62] Division of Ser. No. 149,012, June 1, 1971, Pat. No. 3,819,692.

[30] Foreign Application Priority Data

June 18, 1970 United Kingdom............... 29740/70

[52] U.S. Cl. .............................................. 260/517
[51] Int. Cl. ........................................ C07c 103/12
[58] Field of Search ................................... 260/517

[56] References Cited
UNITED STATES PATENTS 3,131,178  4/1964  Archer et al....................... 260/517
3,819,692  6/1974  Feit et al............................ 260/519

*Primary Examiner*—Anton H. Sutto
*Assistant Examiner*—E. Jane Skelly
*Attorney, Agent, or Firm*—Jackson, Jackson & Chovanes

[57] ABSTRACT

The invention relates to a series of new compounds, to salts of these compounds and to methods for the preparation of the compounds. The new compounds have the general formula:

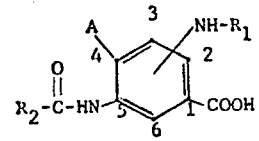

I in which $R_1$ is selected from the group consisting of alkyl radicals with from 3 to 8 carbon atoms in the carbon chain; mono-nuclear aromatically and mono-nuclear heterocyclically substituted methyl and ethyl; A is selected from the group consisting of unsubstituted and substituted phenoxy radicals, phenylthio radicals, benzoyl, benzyl and α-hydroxybenzyl radicals; $R_2$ is selected from the group consisting of hydrogen, lower alkyl groups, lower alkoxy groups, unsubstituted and mono- and di-substituted amino groups.

In particular the compounds of formula (I) have a pronounced diuretic and/or saluretic activity which is surprising in view of the chemical structure and the absence of a sulphamyl group.

2 Claims, No Drawings

BENZOIC ACID DERIVATIVES

This is a division of Ser. No. 149,012, field June 1, 1971, now U.S. Pat. No. 3,819,692.

This invention relates to a series of new compounds, to salts of these compounds and to methods for the preparation of the compounds. The new compounds have the general formula:

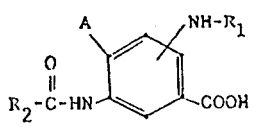   I in which $R_1$ is selected from the group consisting of alkyl radicals with from 3 to 8 carbon atoms in the carbon chain; mono-nuclear aromatically and mono-nuclear heterocyclically substituted methyl and ethyl; A is selected from the group consisting of unsubstituted and substituted phenoxy radicals, phenylthio radicals, benzoyl, benzyl and α-hydroxybenzyl radicals; $R_2$ is selected from the group consisting of hydrogen, lower alkyl groups, lower alkoxy groups, unsubstituted and mono-lower and di-lower alkylamino groups.

Whenever the expression "lower alkyl" is used in the foregoing and in the following it stands for a straight or branched alkyl radical with from 1–6 carbon atoms in the chain.

In particular, $R_1$ can be a straight or branched alkyl radical, e.g. a propyl, isopropyl, butyl, isobutyl, or tert. butyl radical, or one of the different isomeric pentyl, hexyl, heptyl or octyl radicals. When $R_1$ represents a mono-nuclear heterocyclically substituted methyl or ethyl group the heterocycle can be a monocyclic radical containing one oxygen, sulphur or nitrogen atom as ring member, e.g. 2-, 3- or 4-pyridyl, 2- or 3-furyl or -thienyl. Illustrative examples of such mono-nuclear substituted methyl and ethyl groups are benzyl, 1- or 2-phenylethyl, furyl-methyl and the corresponding ethyl radicals.

The benzene nucleus of the substituents A and $R_1$ of formula (I) can be substituted in different positions with different groups, such as one or more halogen atoms, e.g. chlorine or bromine atoms, lower alkyl, halo-lower alkyl, e.g. trifluoromethyl, chloromethyl, 2-chloroethyl, dichloromethyl, trichloromethyl or bromomethyl; carboxy, carb(lower)alkoxy or carbamyl radicals; di-lower alkylamino radicals, hydroxy groups, which may be etherified, e.g. lower alkoxy such as methoxy, ethoxy, n-propoxy, isopropoxy, n-butoxy or isobutoxy; or esterified with lower aliphatic carboxylic acids, such as lower alkanoic acids, e.g. acetic, propionic or pivalic acid, lower alkenoic acids, e.g. acrylic or methacrylic acid, lower aliphatic dicarboxylic acids, e.g. oxalic, malonic, succinic, glutaric, adipic, maleic or fumaric acid or their halfesters with lower alkanols, e.g. methanol or ethanol; or etherified mercapto groups such as methylthio, ethylthio, isopropylthio, butylthio or isobutylthio.

In the formula (I) $R_2$ preferably stands for alkyl with from 1–5 carbon atoms in the chain which can be straight or branched, or for alkoxy groups with from 1–4 carbon atoms in the chain which can be straight or branched, or for amino, mono-lower alkylamino or di-lower alkylamino groups, e.g. methylamino, ethylamino, diisopropylamino and similar primary and secondary amines with from 1–4 carbon atoms in the alkyl group attached to the amino group.

The salts of the compounds are in particular pharmaceutically acceptable salts, and include, for example, alkali metal salts, alkaline earth metal salts, the ammonium salt, or amine salts formed, for instance, from mono-, di-, or trialkylamines, or mono-, di-, or trialkanolamines or cyclic amines.

According to animal experiments performed it has now been found that the compounds of formula I of the invention have a pronounced diuretic and/or saluretic activity which is surprising in view of the chemical structure and the absence of a sulphamyl group. The low toxicity in connection with a favourable therapeutic index make the present compounds particularly valuable.

For use in human and veterinary practice the compounds can be administered by the oral, enteral or parenteral route, and can preferably be prescribed in the form of e.g. tablets containing the free acid, or a salt thereof with an atoxic base mixed with carriers and/or auxiliary agents.

According to preliminary trials the compounds of the invention are appropriately given by the oral route in doses from 5 mg. to 50 mg. each, once, twice, or thrice daily always depending on the condition of the patient and under direction of the physician. When given by the parenteral route the doses are preferably 2.5 mg. to 25 mg. administered appropriately once a day. Salts, which are soluble in water, are with advantage used in preparations for injection.

The pharmaceutical preparations are useful in the treatment of oedematous conditions e.g. cardiac, hepatic, renal, lung and brain oedema, or oedematous conditions during pregnancy, and of pathological conditions which produce an abnormal retension of the electrolytes of the body and in the treatment of hypertension.

In the method according to the invention the new, highly active compounds of formula I can be prepared from an inactive or very weak starting material of the general formula:

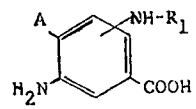   II in which A and $R_1$ are as defined above.

This compound can be transformed into a compound of the invention by acylation with an acid of the formula $R_2COOH$ in which $R_2$ has the meaning as defined hereinbefore or a reactive derivative of the acid in question, e.g. an anhydride, a mixed anhydride, or an acid halide, preferably an acid chloride of a carboxylic acid such as acetic acid, or with a carbamyl halide such as dimethylcarbamyl chloride, or by reacting with an alkylisocyanate or isocyanic acid, or an alkyl chlorocarbonate to form the compound of formula I. These reactions are all well-known to the man skilled in the art.

Depending on the reaction conditions the compounds are obtained as free carboxylic acids, as salts thereof or as esters thereof. In the latter case the ester obtained is subsequently saponified.

The starting materials of formula II in which the NH-R₁ group is placed in the 3-position can be prepared in several ways. In one method 3-amino-4-A-5-nitrobenzoic acids are alkylated at the 3-amino group followed by a reduction of the 5-nitro group to a 5-amino group. The alkylation processes are well known methods which are described in the complete specification of our South African patent no. 69/8615. The reduction of the nitro group can be performed for instance by a catalytic hydrogenation or by reduction with e.g. dithionite or ferro salts in suitable solvents depending of what A stands for. The 3-amino-4-A-5-nitro-benzoic acids are new compounds, which can be prepared from the corresponding 4-A-3,5-dinitro-benzoic acids by a partial reduction for instance by addition of sodium dithionite to the pyridinium salt of the acid in question at or about room temperature.

The compounds 4-A-3,5-dinitro-benzoic acids are partly known compounds and the unknown can be prepared by methods described in the chemical literature for similar compounds. For example are the 4-benzoyl-derivatives prepared according to the following reaction:

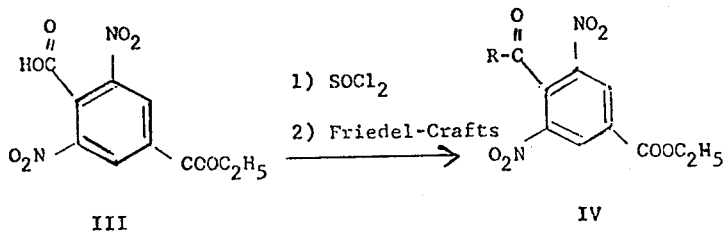

III          IV in which reaction the starting substance of formula III is known and has been described in Chem. Ber. 26, p. 2983, (1893).

The products of formula II in which A is benzyl can be prepared from the corresponding benzoyl-derivatives by a Wolff-Kishner reaction as a last step.

The compounds of formula (I) in which A is an α-hydroxybenzyl radical can be prepared from the corresponding benzoyl-derivatives by reduction, preferably with sodium borohydride.

When A is phenoxy or phenylthio the compounds can be prepared from a 4-halo-3,5-dinitro benzoic acid by reacting this compound with a compound of the formula A—H, i.e. with a phenol or a thiophenol, preferably at a pH above 7.

The starting materials of formula II in which the NH-R₁ group is placed in the 2-position and A represents phenoxy or phenylthio can for instance be prepared from 2—NH—R₁—4—A—5—-nitro-benzoic acids by reduction of the nitro group by known methods. As already mentioned above the reduction method preferred depends on the meaning of the substituent A. The 2—NH—R₁—4—A—5-nitro-benzoic acids can be prepared e.g. from 2-fluoro-4-chloro-benzoic acid which by nitration is converted to the 2-fluoro-4-chloro-5-nitrobenzoic acid, whereupon the fluoro atom is replaced by the NH-R₁ group and finally the chloro atom in the 4-position is replaced by the group A by reaction with a compound of the formula AH, i.e. with a phenol, a thiophenol preferably at a pH above seven.

The starting materials of formula II in which the NH-R₁ group is placed in the 2-position and A is benzoyl can be prepared from the known 2-amino-4-carboxy-5-nitro-toluene which after acylation of the amino group is subjected to a Friedel-Crafts reaction whereby the carboxy group is converted into a 4-benzoyl group. By oxydation in known manner the methyl group is oxydized to a carboxy group and after deacylation of the protected amino group the 2-amino-4-benzoyl-5-nitro benzoic acid is obtained. By alkylation of the 2-amino group followed by a reduction of the 5-nitro group by well-known processes the compounds of formula II in which A is a benzoyl radical is obtained. These compounds can be converted to compounds of formula II in which A is α-hydroxybenzyl by a reduction with for instance sodium borohydride and to the compounds of formula II in which A is benzyl by a Wolff-Kishner reduction.

The preparation of the compounds are described more in detail in the following Examples which are only illustrative and not limiting for the invention:

EXAMPLE 1.

A. 3-Amino-5-nitro-4-phenoxy-benzoic acid

To a suspension of 3,5-dinitro-4-phenoxy-benzoic acid (40 g.) in water (400 ml.) pyridine (60 ml.) is added, while stirring. When the formation of the pyridine salt is completed the mixture is cooled to 10° C. and a solution of sodium dithionite (52 g. containing 87% sodium dithionite) in water (400 ml.) is added during 10 minutes, while stirring and keeping the temperature below 12° C. Then the still cold solution is filtered, and the filtrate acidified by addition of 4 N hydrochloric acid (220 ml.). After stirring for 8 hours, the precipitated 3-amino-5-nitro-4-phenoxy-benzoic acid is collected by filtration and recrystallized from ethanol/water. The compound is obtained with a melting point of 231°–232° C.

B. Ethyl 3-benzylamino-5-nitro-4-phenoxy-benzoate

A mixture of 3-amino-5-nitro-4-phenoxy-benzoic acid (27.4 g.), benzyl bromide (43 g.) and ethanol (400 ml.) is refluxed for 4 hours. An additional amount of benzyl bromide (24 g.) is added and the refluxing is continued for 4 hours. After cooling the precipitated ethyl 3-benzylamino-5-nitro-4-phenoxy-benzoate is collected by filtration. After recrystallization from ethanol, the ester is obtained with a melting point of 101°–102° C.

C. 3-Benzylamino-5-nitro-4-phenoxy-benzoic acid

A mixture of ethyl 3-benzylamino-5-nitro-4-phenoxy-benzoate (15 g.), ethanol (225 ml.) and 1 N sodium hydroxide (225 ml.) is heated on a steam bath for 30 minutes. 4 N hydrochloric acid (60 ml.) is added and, after cooling, the precipitated 3-benzylamino-5-nitro-4-phenoxy-benzoic acid is collected by filtration. After recrystallization from ethanol the acid is obtained with a melting point of 190°–192° C.

D. 5-Amino-3-benzylamino-4-phenoxy-benzoic acid

To a solution of sodium dithionite (26 g. containing 87% of sodium dithionite) in water (160 ml.) aqueous ammonia (80 ml. containing 25% of ammonia) and 3-benzylamino-5-nitro-4-phenoxy-benzoic acid (13 g.) are added, while stirring. After 15 minutes the reaction mixture is heated on a steam bath for 30 minutes. 2 N hydrochloric acid (320 ml.) is added and the heating is continued for 15 minutes. After cooling, the precipitated 5-amino-3-benzylamino-4-phenoxy-benzoic acid is collected by filtration, washed with water and recrystallized from ethanol. The compound is obtained with a melting point of 184°–185° C.

EXAMPLE 2.

A. 3,5-Dinitro-4-phenylthio-benzoic acid

A mixture of 4-chloro-3,5-dinitro-benzoic acid (24.6 g.), thiophenol (11.3 ml.), sodium hydrogen carbonate (20 g.), and water (200 ml.) is left standing, until the evolution of carbon dioxide has ceased. Then the reaction mixture is heated to 85° C. for 1 hour. The hot solution is thereafter filtered and the filtrate acidified with 4 N hydrochloric acid. After cooling, the precipitate is collected by filtration and recrystallized from aqueous ethanol. The 3,5-dinitro-4-phenylthio-benzoic acid is obtained with a melting point of 197°–198° C.

B. 3-Amino-5-nitro-4-phenylthio-benzoic acid

A solution of 3,5-dinitro-4-phenylthio-benzoic acid (50 g.) in 0.5 N sodium hydrogen carbonate (900 ml.) is cooled to 7° C. and a solution of sodium dithionite (62 g. containing 87% sodium dithionite) in water (500 ml.) is added during 12 minutes, while stirring and keeping the temperature at 7°–12° C. After filtration 4 N hydrochloric acid (180 ml.) is added to the still cold filtrate, and after stirring for 8 hours, the crystallized 3-amino-5-nitro-4-phenylthiobenzoic acid is collected and recrystallized from aqueous ethanol. The compound is obtained with a melting point of 215°–217° C.

C. Ethyl 3-benzylamino-5-nitro-4-phenylthio benzoate

A mixture of 3-amino-5-nitro-4-phenylthio-benzoic acid (30 g.), benzyl bromide (48 g.), and anhydrous ethanol 450 ml.) is refluxed for 6 hours. After cooling, the precipitated ethyl 3-benzylamino-5-nitro-4-phenylthio-benzoate is collected by filtration and recrystallized from ethanol. The compound is obtained with a melting point of 103°–105° C.

D. 3-Benzylamino-5-nitro-4-phenylthio-benzoic acid

A mixture of ethyl 3-benzylamino-5-nitro-4-phenylthio-benzoate (10 g.), 1 N sodium hydroxide (150 ml.), and water (150 ml.) is heated on a steam bath for 1 hour. After cooling, 1 N hydrochloric acid (155 ml.) is added, the precipitate collected by filtration and recrystallized from aqueous ethanol. The 3-benzyl-amino-5-nitro-4-phenylthio-benzoic acid is obtained with a melting point of 175°–176.5° C.

E. 5-Amino-3-benzylamino-4-phenylthio-benzoic acid

By using 3-benzylamino-5-nitro-4-phenylthio-benzoic acid (6 g.), sodium dithionite (10.8 g.), aqueous ammonia (36 ml.), water (70 ml.), and 4 N hydrochloric acid (100 ml.) and following the procedure of example 1 D, the 5-amino-3-benzylamino-4-phenylthio-benzoic acid is obtained with a melting point of 187°–189° C.

EXAMPLE 3

A. n-Butyl 3-amino-5-nitro-4-phenoxy-benzoate

A mixture of 3-amino-5-nitro-4-phenoxy-benzoic acid (Example 1 A) (12.5 g.), n-butanol (100 ml.) and concentrated sulfuric acid is refluxed for 1.5 hours. The 60 ml. of the solvent are distilled off and after cooling and addition of petrol ether (100 ml.) of the n-butyl 3-amino-5-nitro-4-phenoxy-benzoate is precipitated. The crude ester is suspended in water (200 ml.) and by addition of 1 N sodium hydroxide the pH is adjusted to 7, whereby the pure n-butyl 3-amino-5-nitro-4-phenoxy-benzoate is obtained with m.p. 80°–81° C.

B. 3-n-Butylamino-4-phenoxy-5-nitro-benzoic acid

A mixture of n-butyl 3-amino-5-nitro-4-phenoxy-benzoate (15 g.), toluene (250 ml.) and di-n-butyl sulfate (48 g.) is heated under gentle reflux for 60 hours. After cooling the reaction mixture is extracted with 1 N sodium hydrogen carbonate (100 ml.) and water (100 ml.), whereafter the toluene is removed in vacuo. 2 N sodium hydroxide (160 ml.) and ethanol are added to the residue, and the reaction mixture is heated on a steam bath for 2 hours. The ethanol is removed by distillation. After cooling and adjusting the pH to 1.5 the crude acid is extracted with diethyl ether (500 ml.). After evaporation in vacuo the crude 3-n-butylamino-4-phenoxy-5-nitro-benzoic acid is recrystallize twice from benzene to form the pure compound with m.p. 130°–131° C.

C. 5-Amino-3-n-butylamino-4-phenoxy-benzoic acid

A solution of 3-n-butylamino-4-phenoxy-5-nitro-benzoic acid (8.5 g.) in aqueous ammonia (150 ml. containing 12.5% ammonia) is at 80° C. added to a solution of ferrous sulfate (60 g. $FeSO_4, 7 H_2O$) in water (240 ml.). The temperature of 80° C. is kept for 10 minutes while stirring. After cooling the reaction mixture is filtered. By adjusting the filtrate to pH 3 by addition of 4 N hydrochloric acid the 5-amino-3-n-butylamino-4-phenoxy-benzoic acid precipitates with m.p. 141°–142° C.

EXAMPLE 4.

A. Ethyl 4-benzoyl-3,5-dinitro-benzoate

A mixture of 4-carbethoxy-2,6-dinitro-benzoic acid (10.0 g.) and thionyl chloride (50 ml.) is refluxed for 1 hour. The resulting solution is evaporated in vacuo and the remaining 4-carbethoxy-2,6-dinitro-benzoyl chloride is dissolved in dry benzene (100 ml.). Anhydrous aluminum chloride (10 g.) is then added in portions, while stirring vigorously at room temperature. After the addition is complete, the mixture is stirred for an additional 18 hours and is then refluxed for 1 hour. The reaction mixture is then poured onto a mixture of ice (about 200 g.) and concentrated hydrochloric acid (25 ml.). The precipitated material is collected by filtration and is then dissolved in methylene chloride (about 150 ml.). This solution is washed with water, dried ($MgSO_4$) and evaporated in vacuo. The residue is triturated with ethanol (30 ml.), the precipitate filtered off and washed with ethanol followed by petroleum ether. After drying, crude ethyl 4-benzoyl-3,5-dinitro-benzoate is obtained with a melting point of about 160° C. From the benzene layer of the motherliquors a further crop with the same melting point is obtained. Recrystallization twice from methylcellosolve raises the melting point to 172°–173° C.

B. 4-Benzoyl-3,5-dinitro-benzoic acid

To a hot solution of ethyl 4-benzoyl-3,5-dinitrobenzoate (17 g.) in methylcellosolve (85 ml.), 4 N sodium hydroxide (25 ml.) is added in portions within 5 minutes. The solution is then heated on a steam bath for a further 5 minutes, cooled and acidified with 4 N hydrochloric acid (27.5 ml.). The resulting precipitate is collected by filtration and washed with water. After drying, 4-benzoyl-3,5-dinitro-benzoic acid with a melting point of about 245° C. (dec.) is obtained. Recrystallization from 50% ethanol raises the melting point to 248°–251° C. (dec.).

C. 3-Amino-4-benzoyl-5-nitro-benzoic acid

A solution of 4-benzoyl-3,5-dinitro-benzoic acid (10.6 g.) in a mixture of pyridine (21.5 ml.) and water (60 ml.) is cooled to 15° C. To the stirred solution, sodium dithionite (14.0 g.) is added in portions over a period of 7 minutes keeping the temperature at 15°–17° C. After the addition is complete, the stirring at 15° C. is continued for a further 7 minutes. The resulting red solution is carefully acidified with concentrated hydrochloric acid (40 ml.) keeping the temperature below 20° C. The reaction mixture is left at room temperature for about 20 hours. The precipitated material is then collected by filtration and washed with water. After recrystallization from acetonitrile, 3-amino-4-benzoyl-5-nitro-benzoic acid with a melting point of 203°–204° C. (dec.) is obtained.

D. 4-Benzoyl-3-benzylamino-5-nitro-benzoic acid

A solution of 3-Amino-4-benzoyl-5-nitro-benzoic acid (3.0 g.) and benzylbromide (3.0 ml.) in methylcellosolve (15 ml.) is heated on a steambath for 7 hours. 4 N sodium hydroxide (15 ml.) is added and the heating is continued for a further 30 min. After cooling, the resulting solution is carefully acidified with 4 N hydrochloric acid (20 ml.). The precipitated oil crystallizes on standing overnight. The material is then triturated with ethanol (25 ml.) and is collected by filtration. After drying and recrystallization from ethanol, 4-benzoyl-3-benzylamino-5-nitro-benzoic acid is obtained with a melting point of 197°–199° C. (dec.).

E. 5-Amino-4-benzoyl-3-benzylamino-benzoic acid

To a solution of 4-benzoyl-3-benzylamino-5-nitrobenzoic acid (1.5 g.) in a mixture of pyridine (7.5 ml.) and water (7.5 ml.), sodium dithionite (3.5 g.) is added in portions while stirring at room temperature. After the addition is complete, the reaction mixture is heated on a steambath for 1 hour, and is then evaporated in vacuo. The residue is dissolved in water (about 20 ml.) and the solution is acidified to pH = 2, 0 with hydrochloric acid. The resulting precipitate is collected by filtration and washed with water. After drying and recrystallization from ethanol, 5-amino-4-benzoyl-3-benzylamino-benzoic acid is obtained with a melting point of about 192°–194° C. (dec.).

EXAMPLE 5.

5-Amino-3-benzylamino-4-($\alpha$-hydroxybenzyl)benzoic acid

To a stirred solution of 5-amino-4-benzoyl-3-benzylaminobenzoic acid (3.5 g.) in methanol (35 ml.), sodium borohydride (1.5 g.) is added in small portions during 30 minutes. After additional stirring for 3 hours, the solution is carefully acidified with concentrated hydrochloric acid and is then diluted with water to precipitate 5-amino-3-benzylamino-4-($\alpha$-hydroxybenzyl)benzoic acid.

EXAMPLE 6.

5-Amino-4-benzyl-3-benzylamino-benzoic acid

A mixture of 5-amino-4-benzoyl-3-benzylaminobenzoic acid (3.5 g.), hydrazine hydrate (80%, 6.0 ml.), potassium hydroxide (2.0 g.), water (6.0 ml.) and diethyleneglycol diethyleneglycol 25 ml.) is stirred at 130°–140° C. for 3 hours. The temperature is then during about 1 hour raised to 215° C. allowing volatile material to distil off. Finally the resulting solution is stirred at 215°–220° C. for 3–4 hours until the nitrogen evolution has ceased. After cooling, the solution is diluted with water (25 ml.) and acidified with concentrated hydrochloric acid. The precipitate is collected by filtration, washed with water, dried and recrystallized from ethanol to give 5-amino-4-benzyl-3-benzylamino-benzoic acid with a melting point of 212°–213° C. (dec.).

EXAMPLE 7.

A. 4-Chloro-2-fluoro-5-nitro-benzoic acid

To a mixture of concentrated sulfuric acid (100 ml.) and nitric acid (6 ml., containing 96% nitric acid) 4-chloro-2-fluoro-benzoic acid (20.9 g.) is added, while stirring. After additional stirring for 2 hours, the reaction mixture is poured into ice-water. The precipitate is collected by filtration and washed with water. After recrystallization from aqueous ethanol the 4-chloro-2-fluoro-5-nitro-benzoic acid is obtained with a melting point of 149°–153° C.

B. 2-Benzylamino-4-chloro-5-nitro-benzoic acid

A mixture of 4-chloro-2-fluoro-5-nitro-benzoic acid (15 g.), benzylamine (27.4 g.), and anhydrous ethanol (250 ml.) is left at room temperature for 24 hours. The precipitated benzylammonium salt is collected by filtration, washed with alcohol and diethyl ether. Then the obtained salt is suspended in water (400 ml.), and the mixture acidified by addition of 4 N hydrochloric acid while stirring. The precipitated 2-benzylamino-4-chloro-5-nitro-benzoic acid is collected by filtration, washed with water and dried. The compound is obtained with a melting point of 234°–236° C. under decomposition.

C. 2-Benzylamino-5-nitro-4-phenoxy-benzoic acid

A mixture of 2-benzylamino-4-chloro-5-nitrobenzoic acid (10 g.), phenol (42 g.), and sodium phenolate (11.4 g.) is heated in an oil bath at 140° C. for 4 hours while stirring. Then water (500 ml.) is added and excess of phenol removed from the reaction mixture by steam distillation. After cooling, the precipitated sodium salt of 2-benzylamino-5-nitro-4-phenoxy-benzoic acid is collected by filtration and washed with water. This sodium salt is then suspended in warm water (200 ml.) and the mixture acidified by addition of 4 N hydrochloric acid, while stirring. The precipitate is filtered off, washed with water and recrystallized from aqueous methanol to yield 2-benzylamino-5-nitro-4-phenoxy-benzoic acid with a melting point of 180°–186° C.

D. 5-Amino-2-benzylamino-4-phenoxy-benzoic acid

To a mixture of 2-benzylamino-5-nitro-4-phenoxy-benzoic acid (5 g.), aqueous ammonia (125 ml. containing 25% ammonia), and water (125 ml.), a solution of sodium dithionite (10 g.) in water (50 ml.) is added, and the reaction mixture is heated to 45° C. for 10 minutes. The resulting solution is allowed to cool to room temperature. Then acetic acid is added until pH of 5.4, and the precipitate is collected by filtration. After recrystallization from aqueous ethanol the 5-amino-2-benzylamino-4-phenoxy-benzoic acid is obtained with a melting point of 151°–154° C. under decomposition.

EXAMPLE 8.

5-Acetamido-4-benzoyl-3-benzylamino-benzoic acid

5-Amino-4-benzoyl-3-benzylamino-benzoic acid (0.5 g.) is dissolved in acetic anhydride (3 ml.). The mixture is left for 30 minutes and the precipitate is collected by filtration, washed with cold acetic anhydride and petroleum ether. After drying and recrystallization from aqueous ethanol, the 5-acetamido-4-benzoyl-3-benzylamino-benzoic acid crystallizing with ¼ mol. of water is obtained with a melting point of 196°–198° C.

EXAMPLE 9.

5-Acetamido-3-benzylamino-4-phenoxy-benzoic acid

5-Amino-3-benzylamino-4-phenoxy-benzoic acid (2 g.) is added to acetic anhydride (20 ml.) while stirring. The stirring is continued for an additional 2 hours. Thereafter the precipitate is collected by filtration and recrystallized from ethanol. The 5-acetamido-3-benzylamino-4-phenoxy-benzoic acid is obtained with a melting point of 235°–236° C.

EXAMPLE 10.

3-Benzylamino-4-phenoxy-5-propionamido-benzoic acid

By substituting in example 9 propionic anhydride for acetic anhydride, 3-benzylamino-4-phenoxy-5-propionamido-benzoic acid is obtained with a melting point of 214°–215° C.

EXAMPLE 11.

5-Acetamido-3-benzylamino-4-phenylthio-benzoic acid

5-Amino-3-benzylamino-4-phenylthio-benzoic acid (0.5 g.) is added to acetic anhydride (5 ml.) while stirring. After additional stirring for 3 hours the reaction mixture is diluted with water (50 ml.). After the acetic anhydride is destroyed, the precipitate is collected and recrystallized from aqueous methylcellosolve. The 5-acetamido-3-benzylamino-4-phenylthio-benzoic acid is obtained with a melting point of 256°–258° C.

EXAMPLE 12.

3-Benzylamino-5-formamido-4-phenoxy-benzoic acid

A solution of 5-amino-3-benzylamino-4-phenoxy-benzoic acid (1 g.) in formic acid (10 ml.) is left at room temperature for 2 hours. After evaporation in vacuo, the residue is washed with diethyl ether and recrystallized from ethanol to yield 3-benzoylamino-5-formamido-4-phenoxy-benzoic acid with a melting point of 224°–226° C.

EXAMPLE 13.

3-Benzylamino-5-formamido-4-phenylthio-benzoic acid

A solution of 5-amino-3-benzylamino-4-phenylthio-benzoic acid (0.56 g.) in formic acid (5.6 ml.) is left for 2 hours at room temperature followed by standing for 16 hours in a refrigerator. The precipitation is completed by addition of water (80 ml.). After collection by filtration and recrystallization from aqueous methanol, the 3-benzylamino-5-formamido-4-phenylthio-benzoic acid is obtained with a melting point of 215.5°–217° C.

EXAMPLE 14.

2-Benzylamino-5-formamido-4-phenoxy-benzoic acid

A solution of 5-amino-2-benzylamino-4-phenoxy-benzoic acid (1 g.) in formic acid (10 ml.) is left for 24 hours. The reaction mixture is then poured into water (100 ml.). The precipitate is collected by filtration, washed with water and recrystallized from methanol/water to yield 2-benzylamino-5-formamido-4-phenoxy-benzoic acid with a melting point of 218° C. under decomposition.

EXAMPLE 15.

5-Acetamido-2-benzylamino-4-phenoxy-benzoic acid

A mixture of 5-amino-2-benzylamino-4-phenoxy-benzoic acid (1 g.), acetic anhydride (0.3 ml.), and acetic acid (10 ml.) is stirred for 1½ hours. Water (100 ml.) is then added and the pricipitate collected by filtration and washed with water. After recrystallization from methanol/water, the 5-acetamido-2-benzylamino-4-phenoxy-benzoic acid is obtained with a melting point of 209°–214° C. under decomposition.

EXAMPLE 16.

3-Benzylamino-4-phenoxy-5-n-propylureylene-benzoic acid

A mixture of 5-amino-3-benzylamino-4-phenoxy-benzoic acid (1.67 g.), n-propyl isocyanate (0.425 g.), and acetone (25 ml.) is left for 18 hours at room temperature. After cooling, the precipitate is collected by filtration and recrystallized from acetone/petroleum ether. The 3-benzylamino-4-phenoxy-5-n-propylureylene-benzoic acid is obtained with a melting point of 210°–211° C.

EXAMPLE 17.

3-Benzylamino-4-phenoxy-5-ureido-benzoic acid

A mixture of 5-amino-3-benzylamino-4-phenoxy-benzoic acid (3.35 g.), potassium cyanate (1 g.), and acetic acid (50 ml.) is left at room temperature for 5 hours. Water (250 ml.) is added, the precipitate collected by filtration and redissolved in boiling 1 N sodium hydrogen carbonate (15 ml.). After cooling, the precipitated sodium salt of 3-benzylamino-4-phenoxy-5-ureido-benzoic acid is collected and washed with water. The sodium salt is then dissolved in boiling water (80 ml.), 1 N hydrochloric acid (5 ml.) is added, and, after cooling, the precipitated 3-benzylamino-4-phenoxy-5-ureido-benzoic acid collected by filtration. After recrystallization from ethanol the compound is obtained with a melting point of 213°–214° C.

EXAMPLE 18.

2-Benzylamino-4-phenoxy-5-ureido-benzoic acid

To a mixture of 5-amino-2-benzylamino-4-phenoxy-benzoic acid (1 g.), acetic acid (15 ml.), and water (4 ml.) potassium cyanate (0.3 g.) is added in small portions during 8 minutes, whereafter the reaction mixture is stirred for a further 10 minutes. Water (50 ml.) is then added while stirring, and the precipitate collected by filtration and washed with water. After recrystallization from methanol the 2-benzylamino-4-phenoxy-5-ureido-benzoic acid is obtained with a melting point of 214°–215° C. under decomposition.

EXAMPLE 19.

2-Benzylamino-5-carbethoxyamino-4-phenoxy-benzoic acid

To an ice cooled mixture of 5-amino-2-benzylamino-4-phenoxy-benzoic acid (1 g.), triethylamine (0.6 g.), and water (35 ml.), ethyl chloroformate (0.25 ml.) is added while stirring. The stirring is continued for 1½ hours at 2°–5° C. and 30 minutes at room temperature. After acidification with hydrochloric acid the precipitate is collected by filtration and washed with water. After recrystallization from methanol/water the 2-benzylamino-5-carbethoxyamino-4-phenoxy-benzoic acid is obtained with a melting point of 192°–194° C. under decomposition.

EXAMPLE 20.

3-Benzylamino-5-carbethoxyamino-4-phenoxy-benzoic acid

To a mixture of 5-amino-3-benzylamino-4-phenoxy-benzoic acid (1.4 g.), acetone (50 ml.), and water (50 ml.), 2 N sodium hydroxide is added until a pH of 7.5. Then a solution of ethyl chloroformate (0.65 g.) in acetone (10 ml.) is added during 30 minutes to the reaction mixture while keeping the temperature at 5°–10° C. and the pH at 7.5 using an automatical end point titrator. When the base consumption has become negligible, 4 N hydrochloric acid is added until a pH of 2.5. The precipitate is collected by filtration and recrystallized from ethanol to yield 3-benzylamino-5-carbethoxy-4-phenoxy-benzoic acid with a melting point of 215° C. under destruction.

EXAMPLE 21.

3-n-Butylamino-4-phenoxy-5-ureido-benzoic acid

A mixture of 5-amino-3-n-butylamino-4-phenoxy-benzoic acid (0.4 g.), acetic acid (15 ml.), and potassium cyanate (0.3 g.) is left at room temperature for 3 hours. Water (50 ml.) is added and the precipitated 3-n-butylamino-4-phenoxy-5-ureido-benzoic acid collected by filtration. After recrystallization from ethanol the compound is obtained with a melting point of 202°–204° C.

EXAMPLE 22.

3-Benzylamino-5-methylureylene-4-phenoxy-benzoic acid

A solution of methyl isocyanate (0.09 g.) in acetone (5 ml.) is added dropwise to a solution of 5-amino-3-benzylamino-4-phenoxy-benzoic acid (0.67 g.) in acetone (10 ml.) at 5° C. Then the reaction mixture is allowed to reach room temperature and kept at this temperature for 22 hours. After cooling the precipitated 3-benzylamino-5-methylureylene-4-phenoxy-benzoic acid is collected by filtration and recrystallized from ethanol. The compound is obtained with a melting point of 224°–225° C.

EXAMPLE 23.

5-Acetamino-3-benzylamino-4-(α-hydroxybenzyl)benzoic acid

By substituting in example 8,5-amino-3-benzylamino-4-(α-hydroxybenzyl)benzoic acid for the 5-amino-4-benzoyl-3-benzylaminobenzoic acid, 5-acetamino-3-benzylamino-4-(α-hydroxybenzyl)benzoic acid is obtained with a melting point of 180°–181° C. (dec.).

EXAMPLE 24.

4-Benzyl-3-benzylamino-5-ureido-benzoic acid

To a stirred, hot solution of 5-amino-4-benzyl-3-benzylamino-benzoic acid (1.65 g.) in acetic acid (35 ml.) and water (1 ml.), potassium cyanate (0.41 g.) is added in portions during 2 minutes. After additional stirring for 10 minutes the solution is left in a refrigerator overnight. The resulting precipitate is collected by filtration, washed with cold acetic acid and with water and is dried in air. After recrystallization from methyl cellosolve, 4-benzyl-3-benzylamino-5-ureido-benzoic acid is obtained with a melting point of 270°–275° C. (dec.).

What we claim is:

1. Compounds of the general formula I

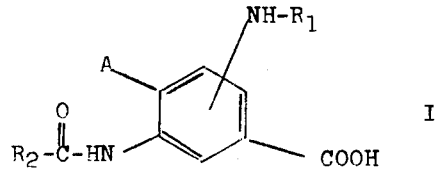

in which $R_1$ is selected from the group consisting of alkyl radicals with from 3 to 8 carbon atoms in the carbon chain, and phenyl substituted methyl and ethyl; A is benzoyl; $R_2$ is selected from the group consisting of hydrogen and lower alkyl groups; and pharmaceutically acceptable salts of the carboxylic acid of formula I.

2. 5-Acetamino-4-benzoyl-3-benzylamino-benzoic acid, and pharmaceutically acceptable salts thereof.

* * * * *